Aug. 18, 1936.  W. C. GOSS  2,051,246

HYGROMETER

Filed April 18, 1932  2 Sheets-Sheet 1

INVENTOR
WORTH C. GOSS
BY
Cook & Robinson
ATTORNEY

Aug. 18, 1936.  W. C. GOSS  2,051,246
HYGROMETER
Filed April 18, 1932  2 Sheets-Sheet 2
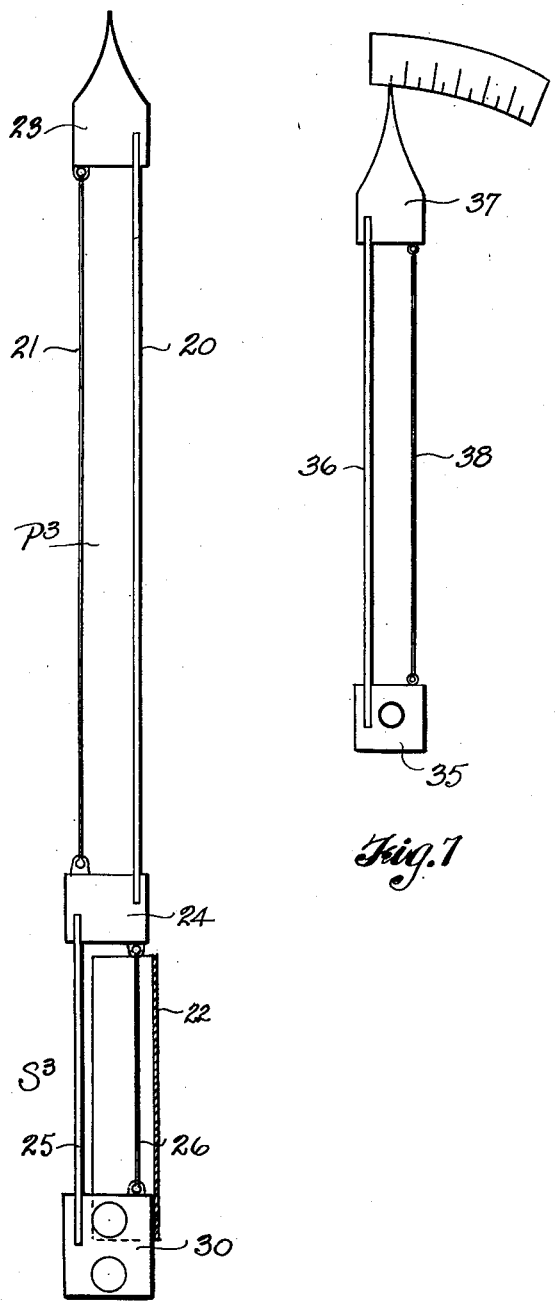

Patented Aug. 18, 1936

2,051,246

UNITED STATES PATENT OFFICE 2,051,246

HYGROMETER

Worth C. Goss, Seattle, Wash., assignor to Humidity Control Company, a corporation of Washington Application April 18, 1932, Serial No. 606,043

9 Claims. (Cl. 73—24)

This invention relates to hygrometers and more particularly to those types of hygrometers employing elements that are made up of materials having different hygroscopic characteristics, and which are associated together in such manner that changes in the relative humidity of air surrounding the elements will cause them to change shape in accordance with the extent of change of relative humidity.

Explanatory to the present invention, it will be stated here that hygrometers of that character employing wooden strips as the hygroscopic elements, if subjected to any unusual or long continued strain, will acquire more or less permanent "set" which thereafter will prevent the instrument indicating readings according to its original calibration. This permanent "set" may result from any strain, either of compression or tension, sufficient to cause fatigue or a molecular change in the internal structure of the piece of wood affected, and it has been found to be very difficult to construct a dependable and sensitive instrument that will not be subjected, at some time, to a strain which will cause some degree of "set" therein. For example, should an instrument be made up to operate without apparent strain in a relative humidity ranging from fifty to seventy five per cent and should it be subjected for a continued period to a relative humidity of eighty per cent, permanent "set" in one direction to some extent will result. Likewise, if the instrument should be subjected to a continued relative humidity of forty per cent, permanent "set" in the opposite direction will result. However "set" is most apt to occur at the higher percentages because of softening of the material.

In view of the foregoing, it has been the principal object of the present invention to provide means to compensate for any permanent "set" which may result either from normal or from abnormal conditions so that the instrument will at all times and under all ordinary conditions give readings that are correct to a satisfactory degree.

More specifically stated, the objects of the present invention reside in the provision of a hygrometer of the above character comprising a humidity sensitive element which is operable in the usual manner to indicate changes of, and the degree of, relative humidity and which is associated with or mounted by a compensating humidity sensitive element arranged in a manner opposite to that of the first element and of such construction that any condition that will cause permanent "set" in the first element will cause a like amount of "set" in the second element and in the opposite direction, and this, by reason of the manner in which the two elements are associated, will operate to correct the inaccuracies in readings which otherwise would result from "set" in the first element.

It is also an object of the present invention to provide means associated with the compensating element whereby substantially correct readings will be obtained quickly when the instrument is subjected to changes of relative humidity, regardless of any lag that may occur.

Still another object is to provide a construction for hygrometers for automatically relieving all tension on the humidity sensitive element at a certain predetermined degree of relative humidity.

It is also an object of the invention to provide hygrometers according to the objects of this invention that are commercially practical in every respect, relatively inexpensive, and suitable for all uses to which the ordinary types of hygrometers are applied, either as humidity indicating or control devices.

It is another object of the invention to provide a novel form of element construction, referred to as the "ladder type", by which a very strong and substantial element of increased sensitivity is provided.

Other objects of the invention reside in the various details of construction of the elements, in their combination and in their mode of operation, as will hereinafter be more fully described.

In accomplishing these and other objects of the invention, I have provided the improved details of construction, the preferred forms of which are illustrated in the accompanying drawings, wherein—

Fig. 6 is an elevation of still another type of construction embodying the automatic tension release feature.

Fig. 7 is a modification of the device of Fig. 6.

Referring more in detail to the drawings—

Figure 1:
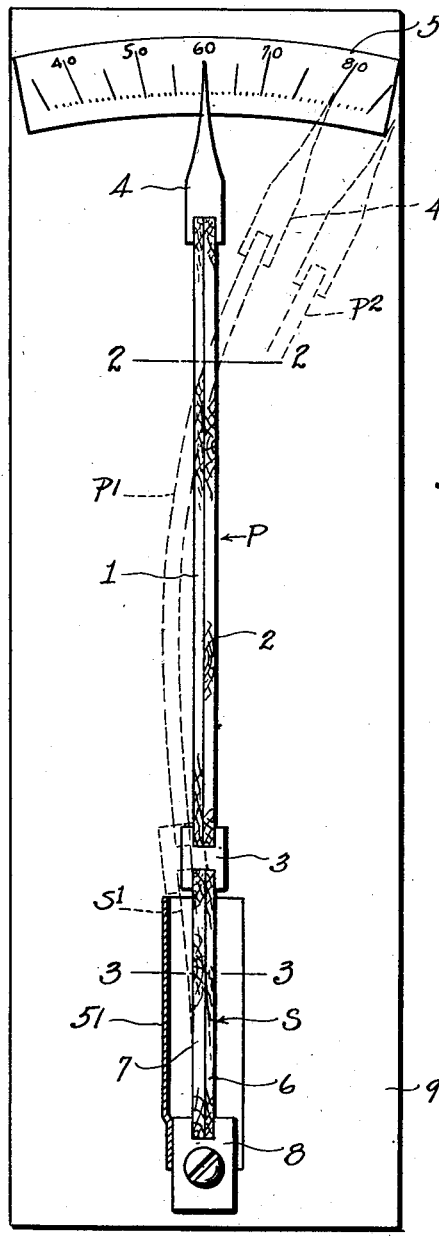
Fig. 1 is an elevation of one form of hygrometer embodying the present invention.
Figure 2:
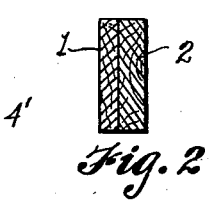
Fig. 2 is an enlarged, cross sectional view through the primary element, on the line 2—2 in Fig. 1, illustrating the direction of the grain of the strips constituting the element.
Figure 3:
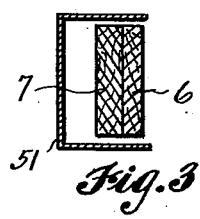
Fig. 3 is a similar, sectional view, on the line 3—3 of Fig. 1 illustrating the direction of grain of materials used and also the use of a shield to delay the action of the compensating element, incident to changes of relative humidity, sufficient to quickly obtain a substantially correct reading by the action of the primary element.

The instrument, as seen in Fig. 1, comprises the indicating, or primary element P, and the compensating or secondary element S. The primary element is made up of two strips of materials of different hygroscopic characteristics. Preferably, it consists of the hygroscopic strip 1, of thin end grain yew wood, and a relatively non-hygroscopic strip 2, preferably of Alaska cedar; the construction of the element being that of the hygrometer illustrated and described in my co-pending application, Serial No. 569,830, filed on October 19, 1931. These two strips, in the construction shown, are co-extensive and are glued firmly together, and the joined strips are rigidly mounted at one end of the element in a block 3 and at the opposite end carry a pointer, or the like, 4 that is disposed adjacent a graduated dial 5 whereby the degree of relative humidity and changes therein will be indicated. The block 3 is of non-hygroscopic character and is mounted upon the outer or movable end of the secondary element S. The secondary element comprises a hygroscopic strip 6, preferably of yew wood, and a relatively non-hygroscopic strip 7, preferably of Alaska cedar; these strips being associated together in a manner like those of the primary strip, but reversed in position; that is, the hygroscopic strip 1 of the primary element is on the side of the primary element opposite to that side on which the hygroscopic strip of the secondary element is located, as will be observed by reference to Figs. 2 and 3.

The secondary element is rigidly mounted at its lower end in a block 8 of non-hygroscopic character that is fixed on a support or backing 9, and the association of the two elements, as illustrated, provides that changes in relative humidity will be indicated by the pointer with reference to its position adjacent the graduated plate 5.

In the construction of this instrument, the secondary element S is designed to acquire exactly the same amount of "set" under any working condition as will be acquired by the primary element P, but its movement, incident to changes in relative humidity, will be considerably less than the movement of the primary element; this being determined by the length or thickness or other characteristics of the strips employed. In the present construction, as disclosed in Fig. 1, the backing strip of element S is thicker than that of the upper element P so as to put more distortion that causes set in the lower element per unit of length than in the upper unit. In this instrument, as disclosed, the thickness of the backing strip of the element P is 1.6 the thickness of the yew wood, while in the element S the backing strip is 2.2 the thickness of the yew wood. Therefore, while the secondary element will bend laterally incident to changes in relative humidity, in a direction opposite to the movement of the primary element, its movement will be sufficiently less that it will not render negative the movement of the primary element, but will only reduce its extent of travel along the indicating dial that it would otherwise have moved had the compensating element not been affected.

With the device constructed as so far described, its operation will be as follows:

Assuming that at a certain relative humidity, for example, sixty per cent, both the primary and secondary elements are substantially straight and that the pointer indicates on the scale 5 the correct relative humidity of sixty per cent, then assume that a change of relative humidity takes place, rising from sixty per cent to eighty per cent. This change causes the primary element P to bend laterally in one direction and the same condition which causes this bending of the primary element, causes a bending movement of the secondary element in the opposite direction. However, the greater length of the primary element, or by reason of differences in details of construction, the primary element will bend to an extent sufficient that its movement will not be negatived by reason of the lateral bending in an opposite direction of its supporting element S.

In Fig. 1 the location of the secondary or compensating element S following this change in relative humidity is indicated in dotted lines at S1 and the resultant position of the primary element P, incident to this change of position of element S and also by reason of the bending of element P that is incident to the above change in relative humidity, is indicated in dotted lines at P1; it being apparent that, had the element S not been affected in any way by the change of relative humidity, the element P and pointer 4 would have moved beyond its dotted line positions, here shown, to a position as at P2.

Assuming then that the change of shape of the elements S and P incident to this abnormal change of relative humidity causes an appreciable strain to be placed on the hygroscopic strips, this will cause a change of the internal molecular structure of the strips and "set" will result. This "set" naturally will operate to prevent the full return of the primary element to any of its original calibrations at a return to a relative humidity within its usual range. However, according to this invention, the lack of distance in return of one element is compensated for by lack of distance in return of the other, this being due to the fact that both elements acquire the same degree of "set" in opposite directions. Thus, any condition which affects the action of one element, has a like effect on the other element, by reason of different proportions in the secondary element, and the result, by reason of their reversed relationship, is a balance that insures correct readings under all conditions. For instance, when the relative humidity returns from eighty to sixty per cent, the primary element having acquired some "set", will not, without the compensating effect of element S, return to original position, but would stop possibly at the sixty three per cent mark. However, since the set in element S prevents its full return to normal position, this lack of distance in return will cause the pointer to show a correct reading.

Figure 5:
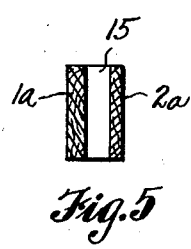
Fig. 5 is a cross sectional view on line 5—5 in Fig. 4.
Figure 4:
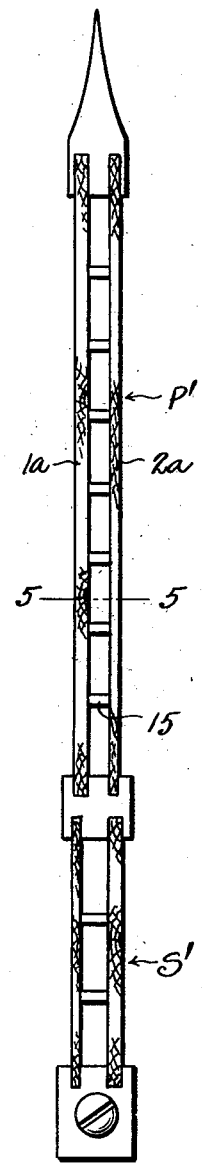
Fig. 4 is an elevation of a similar instrument employing the ladder type of construction.

In the ladder type of construction, as illustrated in Figs. 4 and 5, the primary element P' is made up of a hygroscopic strip of end grain yew wood 1a and a thin, flexible strip 2a of elastic material, such as sheet phosphor bronze spring material. The strips 1a and 2a are parallel and spaced apart and are joined at close intervals by cross pieces 15 of a non-hygroscopic character such as Bakelite; these blocks or spacers being firmly glued or otherwise secured to the strips. The secondary element S' is of a like construction but is reversed in its position, like the arrangement of the elements in the instrument of Fig. 1. These elements, P' and S', are mounted in a manner as previously described and the secondary element operates to compensate for any error in the primary element resultant to "set".

The construction of the elements of this particular alternative structure is that of a truss, and it affords rigidity and strength without impairing accuracy, while sensitivity is materially increased; this being due to the exposure of both surfaces of the hygroscopic strip to the air, and the extreme flexibility of the strips 2a. It will be here mentioned that the spacers 15 should be sufficiently close together that the hygroscopic strip will not collapse between the spacers incident to longitudinal compression, and the distance between the parallel strips should be sufficient that the moment arm afforded by the spacers 15 will be sufficient to easily cause bending of the metallic strips.

In the constructions illustrated in Figs. 6 and 7, is illustrated the automatic tension release feature. In the device of Fig. 6 I have employed primary and secondary elements P³ and S³, respectively mounted and arranged as in the devices of Figs. 1 and 4. The primary element of this alternative construction consists of a spring metal strip 20 and a hygroscopic belt 21 of any suitable material such as wood or hair. The metallic strip and belt are arranged spaced apart and the belt is attached at its ends to blocks 23 and 24 fastened rigidly to opposite ends of the spring metal strip 20. Likewise, the secondary element comprises a metallic strip 25 and a hygroscopic belt 26, spaced apart and attached at their lower ends to a mounting block 30 and at their upper ends to the block 24 which operatively mounts the element P³. This instrument is designed to automatically relieve tension on the hygroscopic belts at a predetermined degree of relative humidity and this degree would be just below that at which the hygroscopic belts, under the spring tension, would become plastic and easily deformed. To provide for this automatic tension release, the lengths of the belts are so adjusted that at the designated degree of relative humidity, they will have lengthened sufficiently that the spring strips assume a neutral position and can exert no pull on the belts; it being apparent that it is the natural tendency of spring strips of this character to assume a neutral, definite position and that there is always a certain amount of force operating to move them to that position, but after that position is reached, they exert no pull or force whatsoever. Therefore, in making up this form of instrument, the belts are made of such length that the springs will assume their neutral position just below the critical degree of relative humidity, in so far as it applies to that belt, but any drop of relative humidity below this predetermined degree will, by reason of shortening of the belt, cause flexing of the strip associated therewith and a consequent movement of the pointer carried thereby. These changes in humidity are indicated by reason of flexing movement of the spring strips under control of the hygroscopic belts. The object of relieving tension on hygroscopic belts at a certain relative humidity is to avoid any strain thereon which would cause permanent deformation; it being a fact that at high percentages of humidity the belts are rendered more or less plastic and their strength is impaired to such extent that any strain is apt to cause an unusual amount of stretch. In this type of construction the upper belt might be made of a thin strip of horn and the lower a piece of thin yew wood. The expansion factor due to change of relative humidity is the same. The lag in absorption of moisture from air in the horn is approximately four per cent relative humidity and in wood is approximately twelve per cent.

A shield 22, may also be used in connection with the secondary element of the device of Fig. 6, for the same purpose as that of the shield in Fig. 1.

The device of Fig. 7 illustrates the application of this particular principle to a hygrometer not equipped with this compensating element. In this view 35 designates a mounting block for a flexible strip 36, and this strip carries a block 37 at its outer end. A hygroscopic belt 38 connects the blocks to effect the flexing of strip 36 and a consequent movement of block 37 in accordance with changes of relative humidity up to the critical point for which the device is set.

In order to provide for obtaining substantially correct readings quickly in the use of such instruments as in Figs. 1, 4, and 6, when they are subjected to changes of relative humidity, I provide for shielding the secondary element to retard its action. As seen in Fig. 1, I locate a shield 51 about the secondary element. It will be explained first that when a change of relative humidity occurs, the elements are affected in a manner to cause them to move quickly through the first part of their movement, but then to slow down. For example, assuming that the instrument shows a reading of seventy per cent relative humidity, and it is then taken into a room at fifty per cent. The elements cause a quick movement back to about fifty five percent in a few minutes, but then slow down and several hours are required to come down to the fifty per cent mark. However, quick readings which will be substantially correct may be obtained by shielding the secondary element so that it will be slowly affected by the surrounding air, then, when the instrument is subjected to a change in relative humidity, the primary element, not being retarded by movement of the secondary element, will move quickly and to a farther extent than otherwise and will show a substantially correct reading. Then, as the secondary element becomes active, it has the tendency to move the primary element back slowly, but this is offset by the final slow movement of the primary element, thus the reading is not disturbed to any appreciable extent.

The advantage of this compensating element, as shown in the several devices, is that it insures correct readings regardless of any permanent set occurring due to strains or stresses set up in the elements incident to use.

Also more rapid readings are made possible due to the arrangement described for shielding these secondary elements, it being understood that this shield should be applied also to the secondary elements of the various modifications illustrated.

While I have described these devices as being used as indicators, it is quite readily apparent that they may be used also as a controller, therefore, I do not wish the claims to be limited only to use of the device as an indicator, but shall apply to any use to which such devices might be put.

Having thus described my invention, what I claim as new therein and desire to secure by Letters Patent is—

1. A hygrometer comprising a primary humidity sensitive element adapted to bend laterally in opposite directions in accordance with changes of relative humidity, a second humidity sensitive element adapted to bend laterally in opposite directions in accordance with changes of relative humidity, but in a direction opposite to movement of the primary element, a fixed support for the secondary element at one end thereof, means at its movable end mounting the primary element; the bending action of the two elements under any change of humidity being of different extent so as not to render negative the movement of the first element and said elements being subjected to definite amounts of "set" so that discrepancies due to "set" occurring in the primary element are compensated for by "set" in the secondary element.

2. A hygrometer comprising a fixed support, a humidity sensitive element of strip form fixed at one end in said support and adapted to bend laterally in opposite directions in accordance with changes in relative humidity, another humidity sensitive element of strip form fixed at one end to the movable end of the first named element and adapted to bend laterally in opposite directions in accordance with changes in relative humidity but in a direction opposite to the direction of bending of the first element; the bending movement of the first element being so proportioned to that of the second element that any movement of the second one is not negatived and each of said elements being subject to definite amounts of "set" under the same conditions so that any discrepancy from original calibration due to "set" in one element is corrected automatically by the proportionate "set" in the other.

3. A hygrometer comprising a primary humidity sensitive element movable in accordance with changes in relative humidity, a secondary humidity sensitive element mounting the first on a movable part thereof and movable in accordance with changes of relative humidity but to a different extent; said elements being subjected to the same conditions and constructed to acquire definite amounts of "set" incident to use and arranged in reverse relation whereby the action of the secondary element automatically corrects deviation from original calibration resultant to the occurrance of "set" in said elements, and means for shielding the secondary element to retard its hygroscopic action.

4. A hygrometer comprising a fixed support, a humidity sensitive element of strip form fixed at one end in said support and adapted to bend laterally in opposite directions in accordance with changes in relative humidity, another humidity sensitive element of strip form fixed at one end to the movable end of the first named element and adapted to bend laterally in opposite directions in accordance with changes in relative humidity but in a direction opposite to the direction of bending of the first element; the bending movement of the first element being so proportioned to that of the second element that any movement of the second one is not negatived, and each of said elements being subject to definite amounts of "set" under the same conditions so that any discrepancy from original calibration due to "set" in one element is corrected automatically by the proportionate "set" in the other, and a shield mounted to enclose the secondary element whereby its correcting influence is retarded.

5. A hygrometer comprising a fixed support, a hygroscopic element fixedly mounted at one end on the support, a second element fixedly mounted on the free end of the first element, as a continuation thereof; each of said elements comprising a substantially rigid spring strip adapted to be flexed in opposite directions, and a hygroscopic strip in special relation thereto and having fixed connection at its ends and at intervals intermediate its ends to the spring strip, the strips of one element being in reversed relation to those of the other, whereby changes in relative humidity causes them to bend in opposite directions and wherein the bending of the first strip is of lesser extent than the other so as not to negative its movement and wherein discrepancy by reason of set in one element is compensated for by "set" in the other.

6. In a hygrometer, a fixed support, a spring strip mounted at one end in the support with its outer end free for lateral movement, a hygroscopic belt attached to the support at one end and at its other end attached to the movable end of the spring strip; said belt being adapted by reason of change in its length incident to changes in relative humidity, to flex the spring strip laterally in accordance with the degree of change and having such length that the spring strip will assume and maintain a neutral position for all degree of relative humidity above a pre-determined degree, thereby to relieve the belt of any strain by reason of its connection with the spring strip.

7. A hygrometer comprising primary and secondary humidity sensitive elements of like character operatively affected by humidity changes and subject to the same degrees of "set" resultant to use; the primary element being mounted by the secondary element and reversed relative thereto whereby its effective changes of position incident to humidity changes are influenced by movement of the secondary element, but not negatived thereby and whereby any lack of movement by reason of "set" occurring therein is compensated for by lack of movement due to "set" in its mounting element.

8. A hygrometer comprising a primary humidity sensitive element adapted to move in accordance with changes in relative humidity, a secondary humidity sensitive element mounting the primary element on a movable part thereof and subject to the same conditions and adapted likewise to change shape in accordance with changes of relative humidity to alter, but not to negative, movement of the primary element; said elements under same conditions being subject to like amounts of "set" and oppositely arranged whereby discrepancies in calibration in the primary element by reason of "set" occurring therein, are compensated for by "set" occurring in the secondary element.

9. In a hygrometer, a resilient strip fixedly supported at one end with its opposite end free for movement from a neutral position, a flexible hygroscopic band connected at one end to a fixed element and at its other end to the movable end of the said strip and of such length as to flex the strip from its neutral position and by reason of the resiliency of the strip to be held under tension thereby for all conditions of relative humidity below a predetermined degree and by elongation to permit the strip to assume its neutral position at the said predetermined degree and thereby to be relieved of tension by the strip.

WORTH C. GOSS.